United States Patent [19]

Ohsaka

[11] Patent Number: 5,617,279
[45] Date of Patent: Apr. 1, 1997

[54] MAGNETIC HEAD WITH MULTI-LAYER MAGNETIC SHIELDING MEMBER SURROUNDING A CORE AND COIL

[75] Inventor: Tomohiko Ohsaka, Yamagata, Japan

[73] Assignee: Mitsumi Electric Co., Ltd., Japan

[21] Appl. No.: 295,921

[22] Filed: Aug. 25, 1994

[30]  Foreign Application Priority Data

Feb. 7, 1994 [JP] Japan .................................. 6-013727

[51] Int. Cl.⁶ ............................. G11B 5/10; G11B 5/127; G11B 5/11; G11B 5/187
[52] U.S. Cl. .......................... 360/128; 360/122; 360/129
[58] Field of Search ................................. 360/128, 122, 360/129

[56]  References Cited

U.S. PATENT DOCUMENTS

| | | | |
|---|---|---|---|
| 3,382,326 | 5/1968 | Camras | 360/128 |
| 4,071,868 | 1/1978 | Kaminaka et al. | 360/113 |
| 4,527,212 | 7/1985 | Ricards | 360/122 |
| 4,636,902 | 1/1987 | Dalziel et al. | 360/128 |
| 5,003,423 | 3/1991 | Imamura et al. | 360/128 |
| 5,189,580 | 2/1993 | Pisharody et al. | 360/122 |
| 5,220,474 | 6/1993 | Ohmori | 360/128 |
| 5,224,001 | 7/1993 | Mizuno et al. | 360/120 |

FOREIGN PATENT DOCUMENTS

| | | |
|---|---|---|
| 1800384 | 5/1970 | Germany . |
| 60-103507 | 7/1985 | Japan . |

OTHER PUBLICATIONS

Patent Abstracts of Japan, vol. 9, No. 253, p. 395, dated Oct. 11, 1985.
Patent Abstracts of Japan, vol. 12, No. 16, p. 656, dated Jan. 19, 1988.
IBM Technical Disclosure Bulletin, vol. 12, No. 4, dated Sep. 1969.

*Primary Examiner*—Stuart S. Levy
*Assistant Examiner*—Adriana Giordana
*Attorney, Agent, or Firm*—Andrus, Seales, Starke & Sawall

[57]  ABSTRACT

A magnetic head for floppy discs has a shielding member surrounding a core and coil of the head so as to prevent the head from being adversely affected by an external magnetic field. The shielding member is a stack of sheets and each sheet is made of magnetic metal such as permalloy and is fixed on a gimbal plate together with the magnetic head. Insulator layers made of thermoplastic resin may be provided between sheets of the stack of sheets to adhere the metal sheets to one another and to electrically insulate the metal sheets from one another.

8 Claims, 6 Drawing Sheets

MAGNETIC HEAD WITH MULTI-LAYER MAGNETIC SHIELDING MEMBER SURROUNDING A CORE AND COIL

BACKGROUND OF THE INVENTION

1. Field of the Invention

The present invention relates to a magnetic head, particularly to a magnetic head having an improved shielding member.

A magnetic head, in particular a magnetic head for floppy discs has a structure, generally speaking, in which a core and coil wound on the core are mounted on a gimbal plate so that they project from the gimbal plate, as is well-known. Therefore, the core and coil are likely to be adversely affected by an external magnetic field. It is thus preferable that a shielding ring or the like be provided in the magnetic head to shield the core and coil from such an external magnetic field.

2. Related Art

With regard to FIGS. 1 and 2, a magnetic head 10 for floppy discs in the related art will now be described. The magnetic head 10 has a core-slider assembly 11 and a shielding ring 12 therein. The core-slider assembly 11 includes a core 13, a coil 16 wound on a middle portion of the core 13 and two sliders 14 and 15. The sliders 14 and 15 are fixed on a top portion of the core 13 and positioned on opposite sides of the coil 16. In other words, the coil 16 is inserted in a space formed between the sliders 14 and 15. The core-slider assembly is fixed on a gimbal plate 17 using adhesive 18.

The shielding ring 12 is made of sintered ferrite obtained as a result of sintering ferrite acting as a magnetic substance and has a rectangle-frame shape, with a rectangular-parallelepiped configuration, so as to surround the above-described core-slider assembly 11. The shielding ring is also fixed on the gimbal plate 17 using the adhesive 18. To shield the core 13 and coil 16 from an external magnetic field is a function of the shielding ring 12.

However, since sintered ferrite is a relatively expensive material, in general, the shielding ring 12 made of the sintered ferrite is relatively expensive. Further, since sintered ferrite is likely to crack, in general, a yield rate of products made of the sintered ferrite, and thus a yield rate of production of the shielding rings 12, is relatively low. Such a low yield rate also causes the cost of the shielding rings 12 to rise and thus the magnetic head 10 is expensive.

SUMMARY OF THE INVENTION

An object of the present invention is to provide a magnetic head, in particular a magnetic head for floppy discs having an improved, economical shielding member therein.

In order to achieve the above object of the present invention, a magnetic head according to the present invention uses a shielding member having a structure formed of a plurality of magnetic layers in a stacked arrangement and surrounding a core and coil of the magnetic head. Such a shielding member such as that having the above-mentioned structure enables the shielding member to be less expensive than the shielding ring 12 of the related art made of sintered ferrite while maintaining a necessary shielding capability of the shielding member. Further, an insulator layer is preferably inserted between the magnetic layers of each pair of adjacent magnetic layers of the plurality of magnetic layers so that the magnetic layers are electrically insulated from one another. Using a shielding member having such a structure suppresses flowing of stray currents in the plurality of magnetic layers and thus enables the shielding capability of the shielding member to be improved.

In particular, using sheets of magnetic metal such as permalloy as the material for the plurality of magnetic layers of the shielding member enables the cost of the material of the shielding member to be reduced and makes it possible to easily produce the shielding members while maintaining the necessary shielding capability of the shielding member. This is because such magnetic layers made of sheets of magnetic metal are relatively inexpensive and can be easily handled, easily processed and have superior mechanical strength in comparison to sintered products such as sintered-ferrite products. Thus, as a result of using sheets of magnetic metal as the shielding member, production costs of the shielding members and thus the production costs of the magnetic heads using the shielding members can be reduced.

Other objects and further features of the present invention will become more apparent from the following detailed description when read in conjunction with the accompanying drawings.

DESCRIPTION OF THE PREFERRED EMBODIMENTS

Each of magnetic heads 30, 40, 50, 70 and 90 in first, second, third, fourth and fifth embodiments according to the present invention, which will be described below, is incorporated into a magnetic-disc device for floppy discs. As well-known, such a magnetic disc device writes data on a floppy disc serving as a magnetic recording medium through such a magnetic head and similarly reads data previously written on a floppy disc. In such operations, the disc device normally uses two similar magnetic heads having a floppy disc inserted therebetween. Each of the magnetic heads is fixed on a flexible gimbal plate so that the magnetic head can move on a rotating floppy disc having surfaces which are inevitably slightly bent. Each gimbal plate having the magnetic head fixed thereon is mounted on a carriage installed in the magnetic disc device so that the magnetic heads can sandwich a floppy disc inserted therebetween.

Writing data on a floppy disc and erasing data previously written on the floppy disc is performed as follows: A predetermined electric current is made flow in a coil of each magnetic head so that a core having the coil wounded thereon generates a corresponding magnetic flux. The core, using the magnetic flux, writes corresponding data on the floppy disc, or erases data previously written on the floppy disc, the core being in contact with the disc. Reading data previously magnetically written on a floppy disc is performed as follows: Magnetic flux flows in the core, which is in contact with the floppy disc, the magnetic flux corresponding to the data previously written on the floppy disc. An electric current, corresponding to the magnetic flux, thus flows in the coil wound on the core, the data being thus read using the electric current.

A shielding ring acting as a shielding member having essential features of the present invention has the following functions: The shielding ring shields the coil and core of the magnetic head from a magnetic field generated by electric circuits present in the magnetic disc device. Thus, the electric current flowing in the coil and the magnetic flux flowing in the core are protected from being adversely affected by the magnetic field, that is, protected from being contaminated by noise during the writing of data onto the floppy disc and reading of data from the floppy disc.

Figure 1:
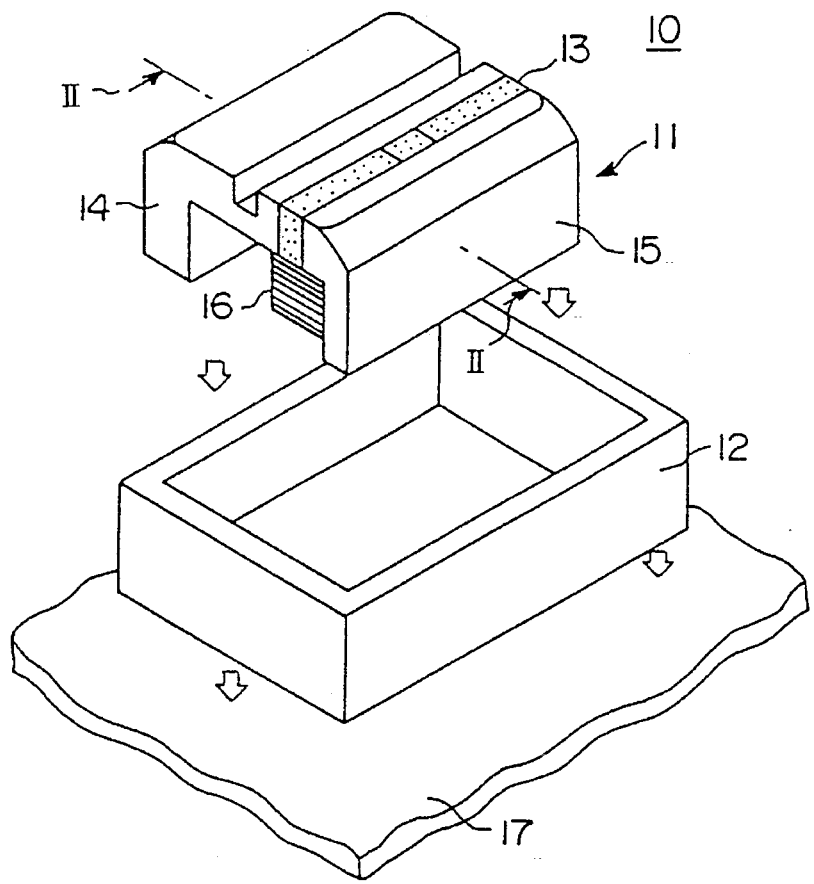
FIG. 1 shows an exploded perspective view of a magnetic head for floppy discs in the related art.
Figure 2:
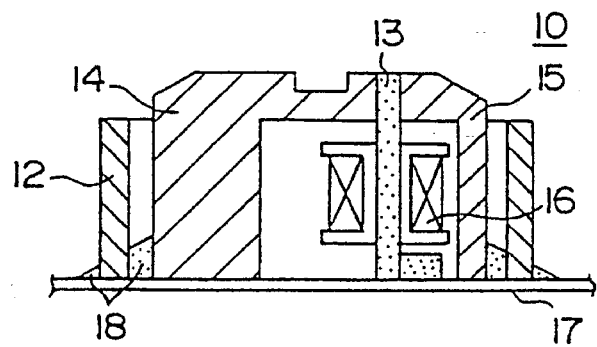
FIG. 2 shows a side elevational sectional view of the magnetic head shown in FIG. 1 taken along a line II—II.
Figure 3:
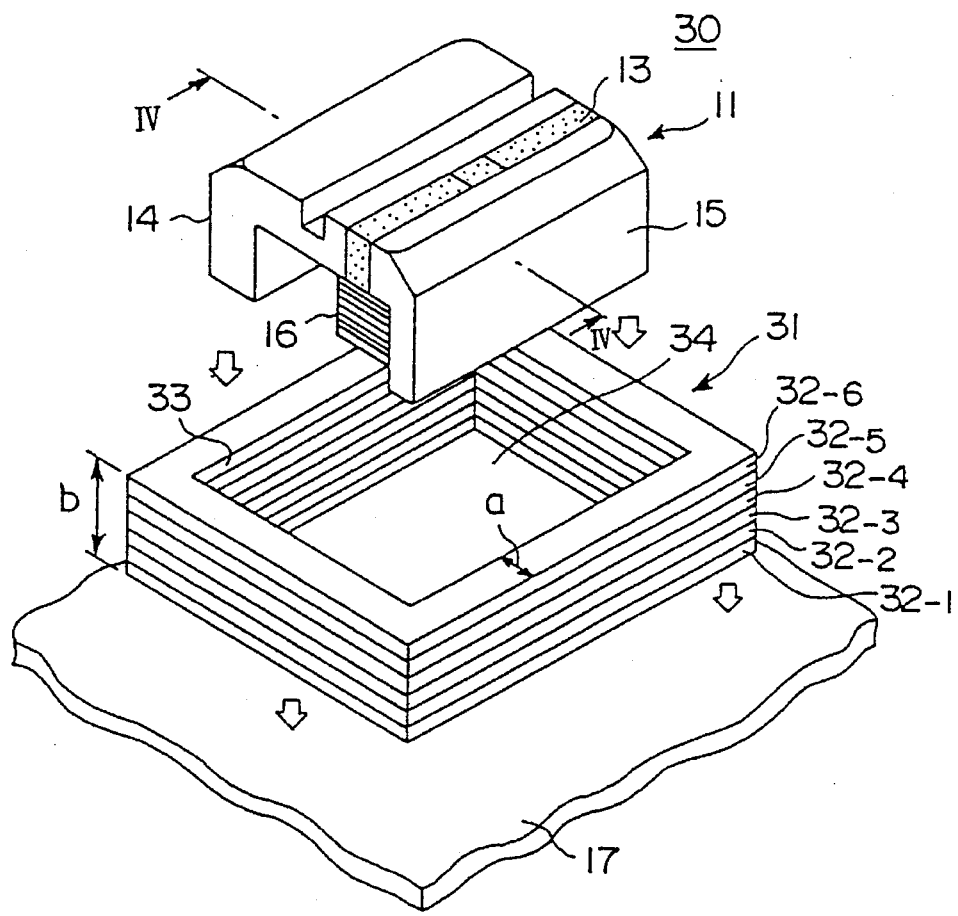
FIG. 3 shows an exploded perspective view of a magnetic head for floppy discs in a first embodiment of the present invention.
Figure 4:
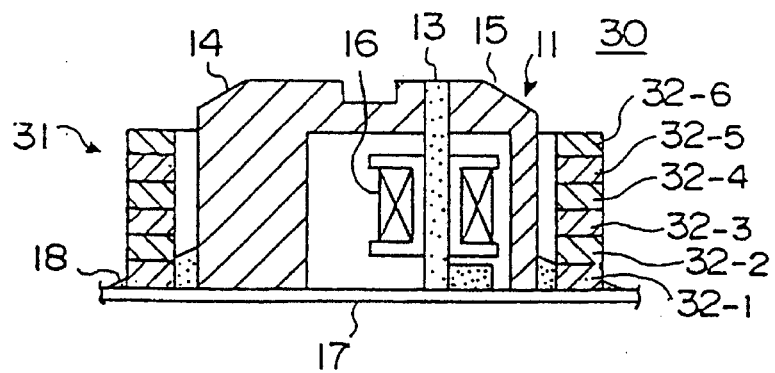
FIG. 4 shows a side elevational sectional view of the magnetic head shown in FIG. 3 taken along a line IV—IV.

With reference to FIGS. 3 and 4, the magnetic head 30 for floppy discs in the first embodiment of the present invention will be described. Elements in FIGS. 3 and 4 having structures identical to those of corresponding elements in FIGS. 1 and 2 are given reference numerals the same as those given to such corresponding elements, description of the elements therefore being omitted. A shielding ring 31 having an opening 34 therein is formed as follows: 6 rectangle-frame-shaped sheet pieces $32_{-1}$ through $32_{-6}$, each made of permalloy and having an opening 33, are formed through a press-using process. The 6 sheet pieces are stacked on one another and fastened to one another by deforming edges of the sheet pieces together so that the 6 sheet pieces are integrated. The openings 33 of the 6 sheet pieces form the opening 34 of the shielding ring 31 as a result of the openings 33 being aligned with one another. As shown in FIG. 3, the shielding ring 31 has a thickness of 'a' and a height of 'b' and is similar to the shape of the shielding ring 12 shown in FIG. 1, thus having a volume $V_1$ equivalent to a volume of the shielding ring 12.

The shielding ring 31 is fixed on the gimbal plate 17 using the adhesive 18 and surrounds the core-slider assembly 11, also fixed on the gimbal plate 17 using the adhesive 18, so as to shield the coil 16 in particular from an external magnetic field. Since the shielding ring 31 has the volume $V_1$ equivalent to the volume of the shielding ring 12, the shielding ring 31 exhibits a sufficient shielding capability. Thus, the magnetic head 30 has a sufficient anti-noise capability.

The shielding ring 31 is fabricated by processing 6 sheet pieces using a pressing machine and then integrating them.

Further, the shielding ring 31 having such a structure has enough mechanical strength so as not to be likely to crack, so that yield rate of production is high. Thus, production costs for the shielding ring 31 are approximately ⅕ the production costs for the shielding ring 12 shown in FIG. 1. The magnetic head 30 is accordingly economical in comparison to the magnetic head 10 shown in FIG. 1 in the related art.

Figure 5:
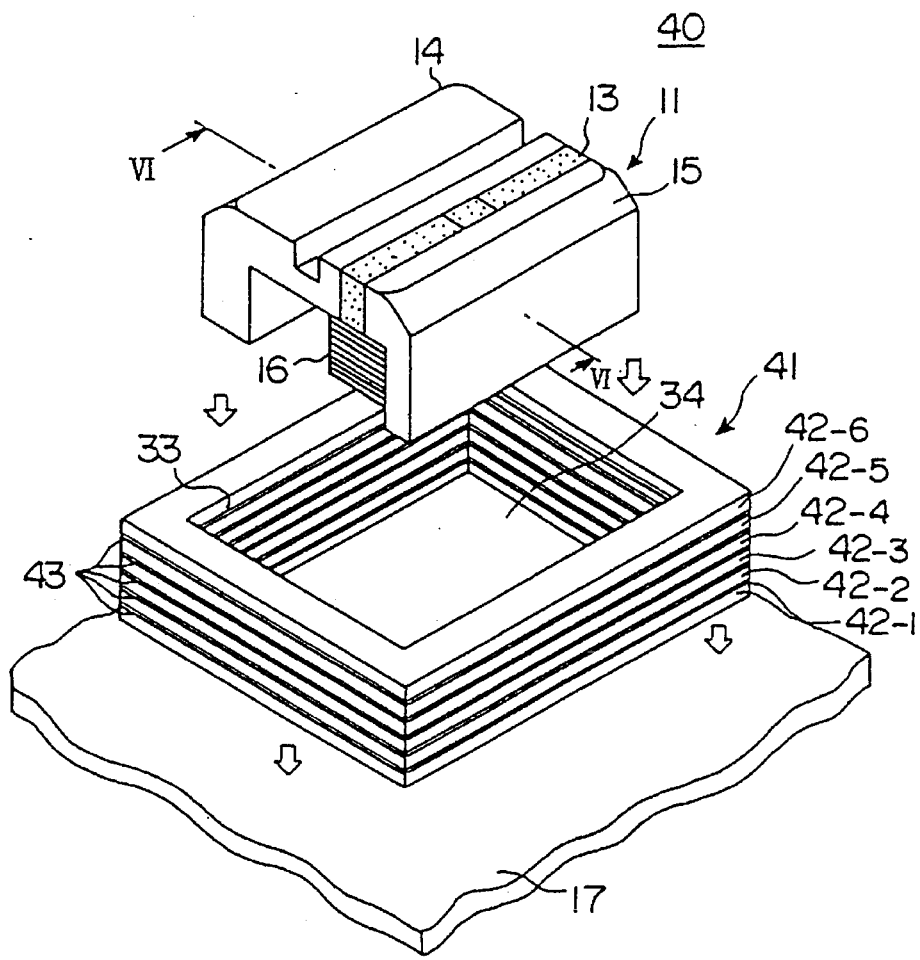
FIG. 5 shows an exploded perspective view of a magnetic head for floppy discs in a second embodiment of the present invention.
Figure 6:
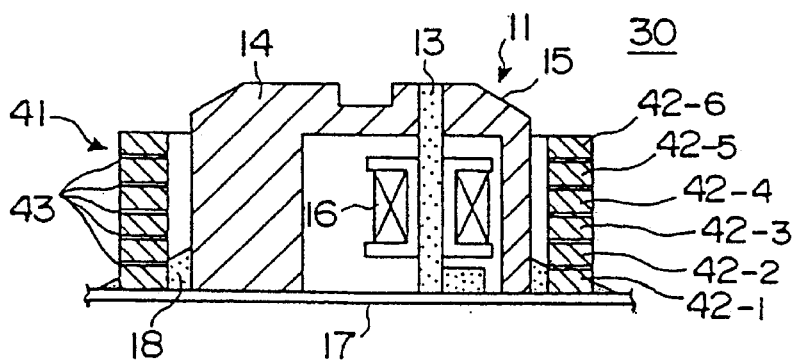
FIG. 6 shows a side elevational sectional view of the magnetic head shown in FIG. 5 taken along a line VI—VI.

With reference to FIGS. 5 and 6, the magnetic head 40 for floppy discs in the second embodiment of the present invention will now be described. Elements shown in FIGS. 5 and 6 having structures identical to those of the corresponding elements shown in FIGS. 3 and 4 are given reference numerals the same as those given to such corresponding elements, description of the former elements therefore being omitted. A shielding ring 41 having an opening 34 therein is formed as follows: 6 rectangle-frame-shaped magnetic-metal sheet pieces $42_{-1}$ through $42_{-6}$ (bottom through top sheet pieces), each made of permalloy and having an opening 33, are formed through a press-using process. An adhesive insulator layer 43 made of thermoplastic resin is provided on a top side of each of the second through bottom sheet piece $42_{-5}$ through $42_{-1}$. Heat is applied to the 6 sheet pieces $42_{-1}$ through $42_{-6}$ previously stacked on one another so that the adhesive insulator layers 43 melt so as to adhere the sheet pieces to one another. Thus, the 6 sheet pieces are integrated. As a result, the respective insulator layers 43 are present between adjacent sheet pieces of the sheet pieces $42_{-1}$ through $42_{-6}$ as shown in FIGS. 5 and 6. The insulator layers 43 electrically insulating the sheet pieces from one another. The openings 33 of the 6 sheet pieces form the opening 34 of the shielding ring 31 as a result of the openings 33 being aligned with one another.

The shielding ring 41 is fixed on the gimbal plate 17 using the adhesive 18 and surrounds the core-slider assembly 11, also fixed on the gimbal plate 17 using the adhesive 18, so as to shield the coil 16 in particular from an external magnetic field.

The shielding ring 41, having a volume equivalent to the volume $V_1$ of the shielding ring 31 shown in FIG. 3, has a structure in which the magnetic-metal sheet pieces $42_{-1}$ through $42_{-6}$ are insulated from one another by using insulator the layers 43 as described above. If an external magnetic field having a frequency of 200 through 600 kHz is applied to the shielding ring 41, a stray electric current is as a result separately induced in each of the sheet pieces $42_{-1}$ through $42_{-6}$. Since a thickness of each of the sheet pieces is small, an electric resistance of the each of the sheet pieces is accordingly high. As a result, the amount of the stray electric current induced in each of the sheet pieces is too small to induce a magnetic field which significantly adversely affects the coil 16 surrounded by the shielding ring 41 consisting of the sheet pieces and insulator layers. Thus, the shielding capability of the shielding ring 41 is higher than that of the shielding ring 31 shown in FIG. 3. Thus, the magnetic head 40 in the second embodiment of the present invention has a superior anti-noise capability in comparison to the magnetic head 30 in the first embodiment.

Further, the shielding ring 41 having the above-described structure can be easily manufactured and also has enough mechanical strength so it is not likely to crack, unlike in the case of the sintered-ferrite shielding ring 12 shown in FIG. 1. Thus, by using the shielding ring 41 having the above-described structure, production costs of the magnetic head 40 in the second embodiment of the present invention can be reduced so as to be less than those of the magnetic head 10 using the sintered-ferrite shielding ring 12.

Figure 7:
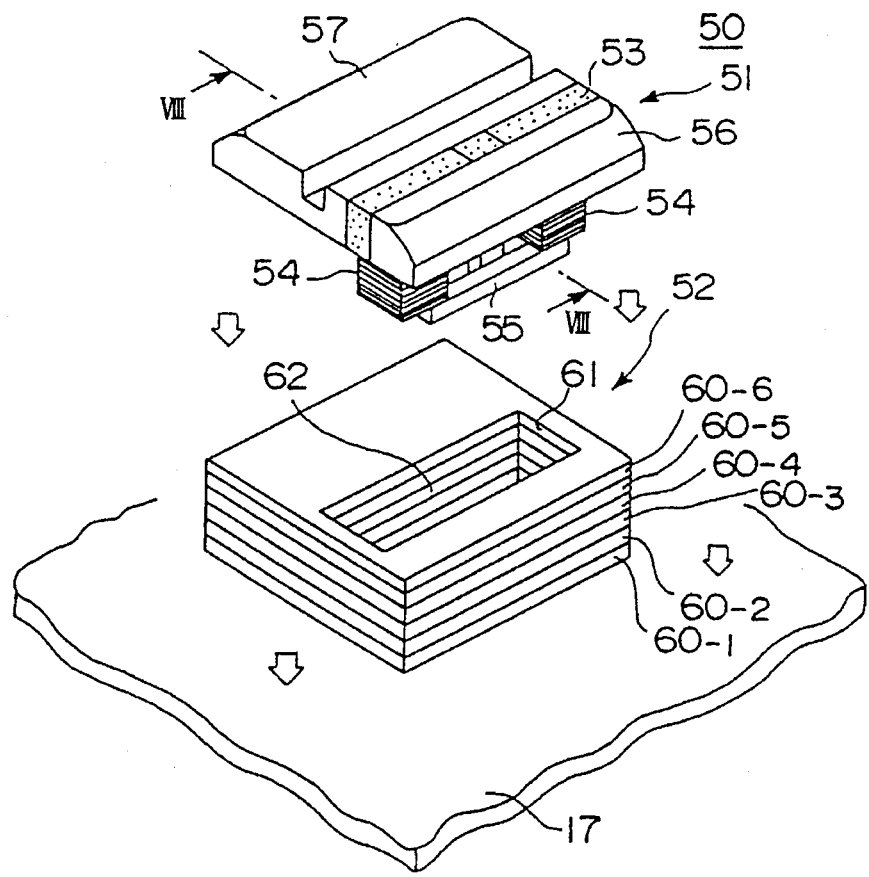
FIG. 7 shows an exploded perspective view of a magnetic head for floppy discs in a third embodiment of the present invention.
Figure 8:
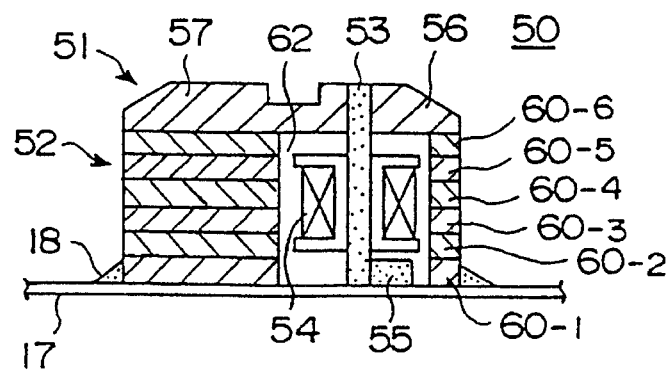
FIG. 8 shows a side elevational sectional view of the magnetic head shown in FIG. 7 taken along a line VIII—VIII.

With reference to FIGS. 7 and 8, the magnetic head 50 in the third embodiment of the present invention will be now described. The magnetic head 50 includes a core-slider assembly 51 and a shielding ring 52. The core-slider assembly 51 includes a core 53, two coils 54, 54 wound on a front-left side and a rear-right side, as shown in FIG. 7, of the core 53 at a middle portion thereof as shown in FIG. 8, a back bar 55 fixed on a bottom portion of the core 53 and two sliders 56 and 57 fixed on two sides of a top portion of the core 53, as shown in the figures.

The sliders 56 and 57 have shapes different from those of the sliders 14 and 15 of each of the magnetic heads 30 and 40 as shown in the relevant figures. That is, the sliders 14 and 15 have portions located at the sides of the coil 16, while the sliders 56 and 57 do not have portions located at the sides of the coils 54 and 54.

The shielding ring 52 which is rectangular-parallelepiped-shaped and has an opening 62 therein is formed as follows: 6 rectangular sheet pieces $60_{-1}$ through $60_{-6}$, each made of permalloy and having an opening 61, are formed through a press-using process. The 6 sheet pieces are stacked on one another and fastened to one another by deforming edges of the sheet pieces together so that the 6 sheet pieces are integrated. The openings 61 of the 6 sheet pieces form the opening 62 of the shielding ring 52 as a result of the openings 61 being aligned with one another. Each of the sheet pieces $60_{-1}$ through $60_{-6}$, has plan view dimensions corresponding to the plan view dimensions of the sliders 56 and 57 and core 53 of the core-slider assembly 51. The opening 62, being rectangular and located on the right side, as shown in FIG. 8, of the shielding ring 52, has a cross sectional area and a position such that the coils 54 and 54 and back bar 55 are fitted in the opening 62 as shown in FIG. 8 while the sliders 56 and 57 are aligned with the shielding ring 52 as shown in FIG. 8.

Thus, the opening 62 has the cross sectional area for containing only a part of the core-slider assembly 51, which part includes the coils 54 and 54 and back bar 55 but does not include the sliders 56 and 57. Accordingly, the cross sectional area of the opening 62 can be smaller than both of the opening of the shielding ring 12 and the openings 34 of the shielding ring 31 and 41, respectively, if the core-slider assembly 51 not including the sliders 56 and 57 has outline dimensions identical to those of the core-slider assembly 11 not including the sliders 14 and 15. As a result, a volume $V_2$ of the shielding ring 52 can be larger than the volume of each of the shielding rings 12, 31 and 41 if outline dimensions of the shielding ring 52 are the same as those of each of the shielding rings 12, 31 and 41.

Bottom surfaces of the sliders 56 and 57 are adhered onto a top surface of the shielding ring 52 so that the coils 54 and 54 and back bar 55 are inserted into the opening 62 and inner walls of the opening 62 surround and are proximate to the coils 54 and 54, as shown in FIG. 8. The magnetic head 50 is fixed on the gimbal plate 17 as a result of adhering a bottom portion of the shielding ring 52 to the plate 17 as shown in FIG. 8.

The shielding ring 52 has a volume $V_2$ larger than those of the rings in the related art and surrounds and is proximate to the coils 54 and 54, as described above. As a result, the shielding ring 52 can have an improved shielding capability in comparison to the shielding ring 31 of the magnetic head 30 shown in FIG. 3. Thus, the magnetic head 50 in the third embodiment of the present invention has a superior anti-noise capability in comparison to the magnetic head 30 in the first embodiment.

Further, the shielding ring 52 having the above-described structure can be easily manufactured and also has enough mechanical strength so it is not likely to crack, unlike in the case of the sintered-ferrite shielding ring 12 shown in FIG. 1. Thus, by using the shielding ring 52 having the above-described structure production costs of the magnetic head 50 in the third embodiment of the present invention can be reduced so as to be less than those of the magnetic head 10 using the sintered-ferrite shielding ring 12.

Figure 9:
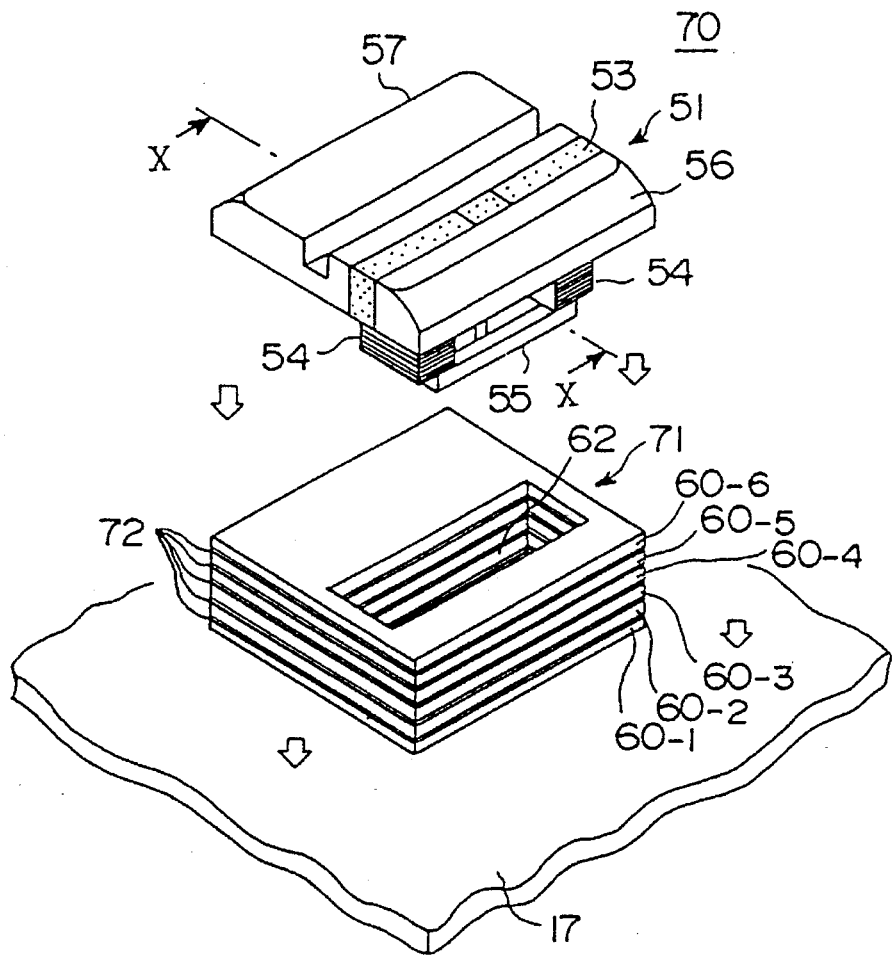
FIG. 9 shows an exploded perspective view of a magnetic head for floppy discs in a fourth embodiment of the present invention.
Figure 10:
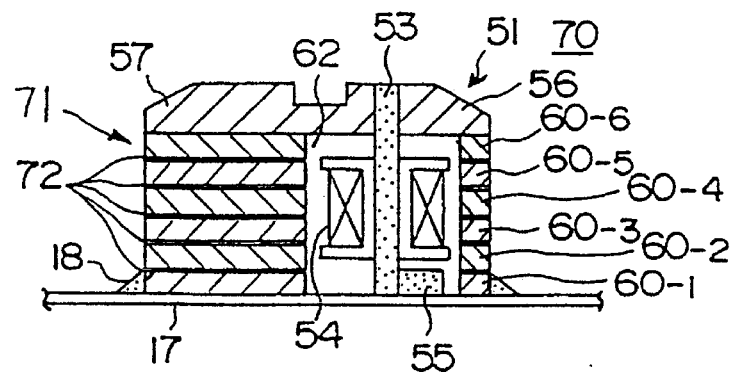
FIG. 10 shows a side elevational sectional view of the magnetic head shown in FIG. 9 taken along a line X—X.

With reference to FIGS. 9 and 10, the magnetic head 70 for floppy discs in the fourth embodiment of the present invention will be now described. Elements shown in FIGS. 9 and 10 having structures identical to those of the corresponding elements shown in FIGS. 7 and 8 are given reference numerals the same as those given to such corresponding elements, description of the former elements therefore being omitted. A shielding ring 71 having the opening 62 therein is formed as follows: An adhesive insulator layers 72 made of thermoplastic resin are provided on a top side of each of the second through bottom sheet pieces $60_{-5}$ through $60_{-1}$. Heat is applied to the 6 sheet pieces $60_{-1}$ through $60_{-6}$ previously stacked on one another so that the adhesive insulator layers 72 melt so as to adhere the sheet pieces to one another. Thus, the 6 sheet pieces are integrated. As a result, the respective insulator layers 72 are present between adjacent sheet pieces of the sheet pieces $60_{-1}$ through $60_{-6}$ as shown in FIGS. 9 and 10, the insulator layers 72 electrically insulating the sheet pieces from one another.

The shielding ring 71 having the opening 62 is fixed on the gimbal plate 17 using the adhesive 18 and surrounds the core-slider assembly 51, also fixed on the gimbal plate 17 using the adhesive 18, so as to shield the coils 54 in particular from an external magnetic field.

Since the shielding ring 71 has a stack arrangement similar to the stack arrangement of the shielding ring 41 shown in FIGS. 5 and 6, the shielding ring 71 has a shielding capability superior to that of the shielding ring 52 shown in FIG. 8, as a result of stray electric currents induced in the sheet pieces $60_{-1}$ through $60_{-6}$ being reduced for the same reason as that described above in the description of the shielding ring 41. Thus, the magnetic head 70 in the fourth embodiment of the present invention has a superior anti-noise capability in comparison to the magnetic head 50 in the third embodiment.

Further, the shielding ring 71 having the above-described structure can be easily manufactured and also has an enough mechanical strength so it is not likely to crack, unlike in the case of the sintered-ferrite shielding ring 12 shown in FIG. 1. Thus, by using the shielding ring 71 having the above-described structure, production costs of the magnetic head 70 in the fourth embodiment of the present invention can be reduced so as to be less than those of the magnetic head 10 using the sintered-ferrite shielding ring 12.

Figure 11:
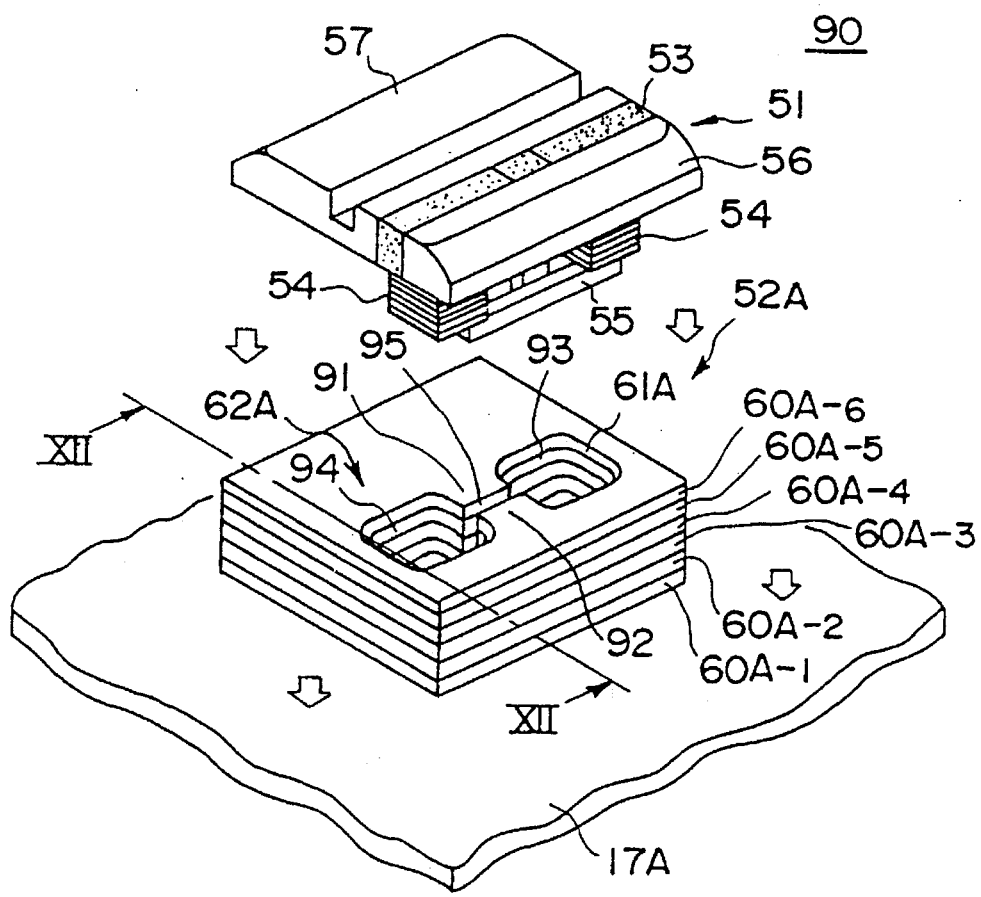
FIG. 11 shows an exploded perspective view of a magnetic head for floppy discs in a fifth embodiment of the present invention.
Figure 12:
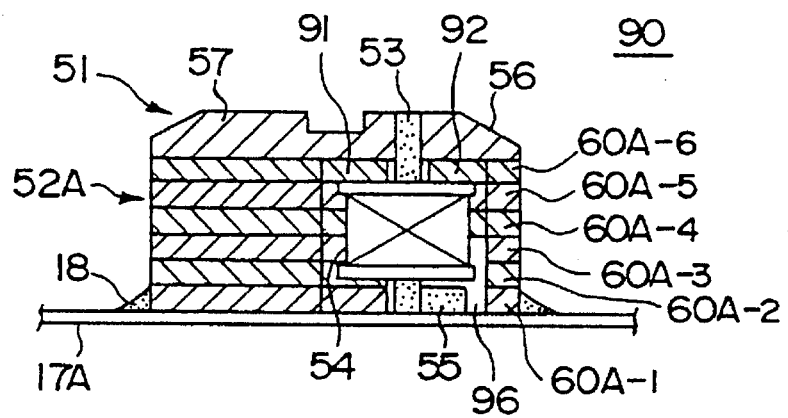
FIG. 12 shows a side elevational sectional view of the magnetic head shown in FIG. 11 taken along a line XII—XII.

With reference to FIGS. 11 and 12, the magnetic head 90 for floppy discs in the fifth embodiment of the present invention will now be described. Elements shown in FIGS. 11 and 12 having structures identical to those of the corresponding elements shown in FIGS. 7 and 8 are given reference numerals the same as those given to such corresponding elements, description of the former elements therefore being omitted. A rigid shielding ring 52A of a magnetic head 90 is identical to the shielding ring 52 of the magnetic head 50, excepting that the shape of an opening 62A of the shielding ring 52A is different from the shape of the opening 62 of the shielding ring 52, as can be seen by comparing FIGS. 9 and 11. In the opening 62A projections 91 and 92 are formed to project inside from opposite sides of the rectangular-shaped opening, while a cross section of the opening 62 is a simple rectangular shape. The projections 91 and 92 define opening portions 93 and 94, each being rectangular, at two sides of the projections 91 and 92 as shown in FIG. 11. Four corners of the rectangular of each of the opening portions 93 and 94 are rounded as shown in FIG. 11. Projecting ends of the projections 91 and 92 further define a clearance portion 95. A distance between the projecting ends of the projection and 92 in the clearance portion 95 is slightly larger than a thickness of the core 53.

Further, as shown in FIG. 12, the projection 92 consists of relevant parts of top three sheet pieces $60A_{-6}$, $60A_{-5}$ and $60A_{-4}$ of the 6 sheet pieces $60A_{-1}$ through $60A_{-6}$. As a result, a space 96 is defined below the relevant part of the bottom sheet piece $60A_{-4}$ of the top three sheet pieces. Therefore, the core-slider assembly 51 identical to that in the magnetic head 50 can be fitted into the opening 62A as shown in FIG. 12. That is, the coils 54 and 54 are inserted into respective opening portions 93 and 94, the core 53 is inserted into the clearance portion 95, and the back bar 55 is inserted into the space 96. However, actually, the back bar 55 is fixed onto the core 53 only after the core-slider assembly 51 without the back bar 55 has been inserted into the shielding ring 52A. Then, after the back bar 55 has been fixed onto the core 53 of the core-slider assembly 51 previously inserted in the shielding ring 52A, the shielding ring 52A carrying the core-slider assembly 51 is fixed on a gimbal plate 17A using the adhesive 18.

The gimbal plate 17A is obtained as a result of forming an opening in a part of the gimbal plate 17 used for the above-described magnetic heads. This part comes into contact with a bottom surface of the above-mentioned projection 91 if the core-slider assembly 51 is properly inserted into the shielding ring 52A. After the magnetic head 90 fixed on the gimbal plate 17A is mounted on the carriage of the magnetic disc device via the gimbal plate 17A, a pivot of the carriage comes into contact with the bottom surface of the projection 91 directly through the opening formed in the gimbal plate 17A, in FIG. 12, of the gimbal plate 17A. Thus, the magnetic head 90 can be positioned by pressing the magnetic head 90 via the rigid shielding ring 52A, not by pressing it via the flexible gimbal plate 17A. As a result, the magnetic device can very accurately position the magnetic head 90 via the carriage and pivot.

Further, the magnetic head 90 in the fifth embodiment of the present invention has advantages in addition to that described above and in addition to those obtained from the magnetic head 50. The projections 91 and 92 are inserted into a space between the coils 54 and 54 after the core-slider assembly 51 is inserted in the shielding ring 52A as shown in FIG. 12. Thus, the shielding ring 52A surrounds and is proximate to the coils 54 and 54, resulting in the shielding capability of the magnetic head 90 being improved in comparison to that of the magnetic head 50.

Further, in each of the magnetic heads 30, 40, 50, 70 and 90, Sendust may be used as the material of the sheet pieces of the shielding ring instead of the permalloy. Further, a laser-beam welding method may be used as a method for fastening the sheet pieces to one another instead of the above-mentioned method of deforming edges of the sheet pieces together.

Further, the present invention is not limited to the above described embodiments, and variations and modifications may be made without departing from the scope of the present invention.

What is claimed is:

1. A magnetic head for use with a magnetic recording medium, said head comprising:

a slider;

two magnetic cores fixed at spaced locations on said slider;

two electrical coils, one of which is wound on each of said two cores, said coils being spaced from each other when so wound, each of said coils having a winding axis about which said electrical coil is wound on said magnetic core, each of said coils having a generally rectangular outline in a cross section taken normal to said winding axis; said rectangular outline being formed by four sides of the coil, each of said coils having one side which faces a side of the other of said coils and having three remaining sides; and a laminated shielding member for shielding said two coils from an external magnetic field and for supporting said slider, said shielding member comprising a plurality of parallel layers arranged in a stack, said layers being formed of a magnetic material, each layer of said plurality of layers of magnetic material being parallel to a plane perpendicular to said axes about which said coils are wound on said cores, said shielding member being formed with a pair of generally rectangular, spaced cavities with a passage opening into said cavities extending therebetween, said cavities and passage extending into said shielding member in a direction along the winding axes of said coils, said cavities receiving said coils so that the layers of said shielding member are in contiguity with said coils such that said member surrounds the entire three remaining sides of each of said coils and partially surrounds said one side of each of said coils as a result of the opening formed in each of said cavities by said passage, thereby to enhance the shielding effect provided by said shielding member, said magnetic head coacting with the recording medium to perform a writing of data onto said recording medium or a reading of data previously written on the recording medium.

2. The magnetic head according to claim 1, wherein each layer of said plurality of layers of magnetic material of said shielding member has openings forming said cavities receiving each of said coils, said openings of said plurality of layers of magnetic material being aligned with one another.

3. The magnetic head according to claim 1, wherein said magnetic head comprises a magnetic head for floppy discs.

4. The magnetic head according to claim 1, wherein each layer of said plurality of layers of magnetic material is made of magnetic metal.

5. The magnetic head according to claim 4, wherein said magnetic metal is permalloy.

6. The magnetic head according to claim 4, wherein said magnetic metal is a high permeability alloy containing Fe, Al, and Si.

7. The magnetic head according to claims 1, wherein said shielding member further comprises insulator layers, said insulator layers being provided between said plurality of layers of magnetic material so as to electrically insulate said plurality of layers of magnetic material from one another.

8. The magnetic head according to claim 7, wherein each layer of said insulator layers is made of thermoplastic resin.

* * * * *